Feb. 23, 1965 W. A. JACOBS 3,170,974
PROCESS FOR EMBOSSING FOAMED THERMOPLASTIC SHEETS
Filed June 6, 1962

INVENTOR
WILLIAM A. JACOBS

BY Fisher, Christen, Sabol & Caldwell
ATTORNEYS

United States Patent Office 3,170,974
Patented Feb. 23, 1965

3,170,974
PROCESS FOR EMBOSSING FOAMED
THERMOPLASTIC SHEETS
William A. Jacobs, Ellenville, N.Y., assignor to Sun
Chemical Corporation, New York, N.Y., a corporation
of Delaware
Filed June 6, 1962, Ser. No. 200,543
6 Claims. (Cl. 264—284)

This invention relates to a novel embossing process and more particularly relates to a novel process for embossing foamed thermoplastic sheet material to impart thereto novel useful and/or decorative shapes, patterns and the like.

Heretofore embossing procedures primarily involved the indentation of the sheet material being embossed. Representative of prior methods of embossing are the disclosures of the following patents: United States Patents Numbers 673,041, 2,723,936 and 3,024,154. Thus in the prior art methods the sheet material was indented to one side or both sides of its normal plane.

A principal object of this invention is to provide a process for embossing foamed thermoplastic sheets to impart thereto various novel and decorative patterns and designs.

A further object is the provision of a process for embossing foamed thermoplastic sheets which process avoids indentation of the sheet to one side or the other thereof.

A further object is the provision of a process for embossing a foamed thermoplastic sheet to provide raised portions on both sides of said sheet without the necessity of employing mating embossing rolls.

Another object is to provide a process for embossing foamed thermoplastic sheets to provide novel embossed foamed thermoplastic sheets having raised portions on one or both sides thereof.

A still further object is the provision of foamed thermoplastic sheets having raised portions on one or both sides thereof in an appealing pattern or design.

Further objects and advantages of this invention will be apparent from the following description taken in conjunction with the appended drawings, in which.

This invention is based on the startling discovery that a foamed thermoplastic sheet can be embossed to provide raised portions on one side or both sides thereof by the use of paired rolls, one of which is an embossing roll having depressed portions and another of which is a smooth-faced roll. This phenomena is brought about by controlling the respective temperatures of the respective sides of the thermoplastic sheet being embossed.

Figure 1:
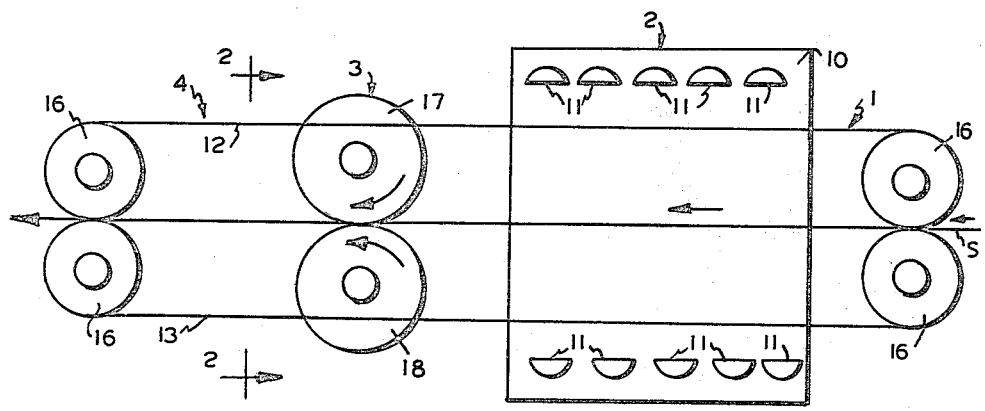
FIG. 1 is a diagramatic view in side elevation showing the apparatus employed in the novel process.

Referring now to FIG. 1 there is shown diagramatically a machine which can be employed in this invention including a conveying means 1, a heating zone 2, embossing zone 3, and cooling zone 4. The foamed thermoplastic material S is moved through the heating zone to the embossing zone 3 and cooling zone 4 by the conveying means 1 which comprises a pair of vertically-disposed, sprocket-driven, continuous chains 12–13 and 14–15 along each edge of the sheet material S. Each chained pair has an upper chain 12 (14) and a lower chain 13 (15). The upper and lower chains 12 (14) and 13 (15) respectively of each pair are substantially co-planar and the lower length of the upper chain 12 (14) normally tightly engages the upper length of the lower chain 13 (15). Such that the sheet material S disposed between them is tightly gripped. The outer surface of each link of the chain 12 through 15 can be provided with suitable friction treads such as rubber so as to better grip the sheet material S. Each chain 12 through 15 is mounted by sprocket wheels 16 at each end thereof and the sprocket wheels 16 are driven by any suitable means such as by an electric motor (not shown) operating at constant speed. The upper and lower chains of each pair are respectively synchronized by any suitable means, for example by gears or chain and sprocket means (not shown) such that all sprocket wheels 16 rotate at substantially the same speed. The sprockets 16 at each end of the upper chains 12 and 14 are commonly shafted as are the sprockets 16 at each end of the lower chains 13 and 15.

The heating zone 2 comprises a 4-walled tunnel 10 having inwardly directed heating lamps 11, e.g. of the infra-red type, mounted on the ceiling and floor of said tunnel. A temperature gradiant is preferably provided in the heating zone such that the entrance portions are maintained at lower or more moderate temperatures than the intermediate portions which, in turn, are maintained at lower or more moderate temperatures than the exit portions adjacent the embossing zone 3. Temperature regulation is conveniently accomplished by regulating the supply of electrical power to, or by adjusting the size or number of lamps operating in, respectively, the entrance portions, the intermediate portions and the exit portions of the tunnel 10. In any event, the temperature at any point in the heating zone 2 should never be permitted to reach or exceed the melting point of the sheet material S; otherwise, undue sagging, distorting and even breaking of sheet material takes place. It is sufficient that the exit temperature of the sheet material S be high enough to render sheet material pliable and formable, e.g. within the softening point range of sheet material. Temperature regulating mans is also provided to permit differential heating of the upper and lower surfaces of the sheet material S. Such that the temperature of the lower surface can be varied from a temperature equal to that of the upper surface to a higher temperature as the sheet material S exits from the oven 10. In general the exit temperature of the sheet material S should be above the heating distortion temperature thereof, but below that temperature at which the sheet material S is incapable to supporting itself against its own gravity as it is held by the chains 12 through 15 at each side thereof.

Figure 2:
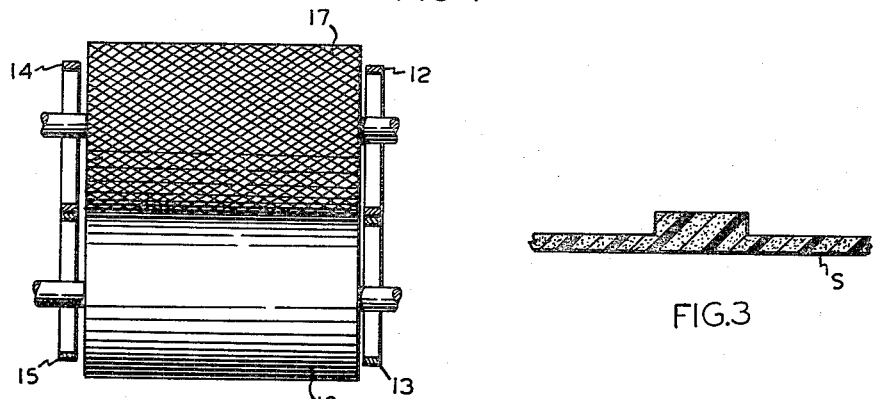
FIG. 2 is a sectional view substantially on line 2—2 of FIG. 1 showing the faces of the embossing roll and smooth roll employed in this invention.

The embossing zone 3 comprises a pair of rolls including an upper roll 17 having depressed portions in the surface thereof and a lower roll 18 having a smooth face. The embossing rolls 17 and 18 are of a width less than the with of the sheet material S such that said embossing rolls freely rotate between the chain pairs 12 through 15 to contact the sheet material S as it is clamped by each chain pair as best shown in FIG. 2. The faces of the embossing rolls 17 and 18 are separated from each other by a distance substantially equal to the thickness of the sheet material S as it enters the nip of said rolls. The amount of separation of the embossing rolls 17 and 18 is not however narrowly critical and can be equal to or less than the thickness of said sheet as it enters the nip of said rolls.

The cooling zone 4 extends beyond the embossing zone 3 for a distance sufficient to provide desired cooling of the embossed sheet material S after it has left the embossing rolls 17 and 18. In general this distance should be sufficient to insure adequate cooling of the sheet material S below its heating distortion temperature. It will be noted that the sheet material S is supported and gripped by the chain pairs 12 through 15 throughout the heating, embossing and cooling operations, thereby, preventing contractions in the width of said sheet material during the heating, embossing and cooling cycle. The sheet material S preferably passes through the heating zone 2 to the embossing zone 3 and the cooling zone 4 at a constant speed as determined by the drive means for the sprocket 16.

Figure 3:
FIG. 3 is a cross section through a typical thermoplastic sheet embossed in accordance with one embodiment of this invention.

As pointed out above the temperature of the sheet material S as it moves into the nip of the rolls 17 and 18 is not narrowly critical and can vary between the heat distortion temperature of the sheet material S and the temperature at which said sheet is incapable of supporting itself against its own gravity. The heat distortion temperature and the temperature at which the sheet will not support itself against its own gravity are different for different materials and will be different depending on the thickness of the sheet material S and the cell size and cell concentration of said sheet material. In general the temperature of the surface of the sheet material S which will contact roll 17 must be equal to or lower than the temperature of the surface which will contact the roll 18. When the temperatures of both surfaces are substantially equal the upper surface will be provided with raised portions in accordance with the depressed portions of the roll 17 and the lower surface will remain substantially flat thus resulting in a cross sectional configuration similar to that shown in FIG. 3.

Figure 4:
FIG. 4 is a cross sectional view of a typical thermoplastic sheet embossed in accordance with another embodiment of this invention.

When the temperature of the lower surface is greater than the temperature of the upper surface raised portions corresponding to the depressions in the roll 17 are found on both surfaces of the sheet material S as shown diagramatically in FIG. 4. The temperature difference between the upper and lower surfaces of the sheet S is not narrowly critical. An illustrative temperature difference is 5° F. and a preferable temperature difference is 10° F. Illustrative temperatures for the upper surface are in the range of 170° F. to 190° F. while illustrative temperatures for the lower surface lie in the range of 200–220° F. for foamed polystyrene prepared by extrusion from a plasticized mixture of polystyrene, nucleating agents including sodium bicarbonate and citric acid, and a blowing agent comprising pentane. When a 10 mil sheet of foamed polystyrene of this character is heated in the heating zone 2 such that the temperature of the upper surface is 190° F. and the temperature of the lower surface is 200° F. as the sheet enters the nip of rolls 17 and 18, there emerges from said rolls a sheet which has gained in thickness to 20 mils or more in the areas where a depression in the roll 17 existed and the thickness in said areas extends beyond both surfaces.

The rolls 17 and 18 are preferably suitably cooled to a temperature below the heat distortion temperature of the sheet material S. For example when employing a foamed polystyrene sheet of a character described above, the rolls 17 and 18 are advantageously cooled to a temperature of 90–120° F. If desired, more pronounced effects can be obtained in producing raised portions on the lower surface of the sheet material S by differentially cooling the rolls 17 and 18 such that roll 17 is at a lower temperature than the roll 18. For example the roll 17 is advantageously cooled to a temperature of 110° F. and the roll 18 is advantageously cooled to a temperature of 125° F. The rolls 17 and 18 can be surfaced with any material such as plastic, rubber, steel and the like.

The process of this invention is not limited in application to any particular type of foamed thermoplastic material but can be employed on the many different types of such material, e.g. polystyrene foam, polyethylene foam, polyurethane foam, polyvinylchloride foam and the like.

What is claimed is:

1. Method of embossing foamed thermoplastic sheet comprising heating both surfaces of said sheet to a temperature above the heat distortion temperature thereof but below that temperature at which said sheet is incapable of supporting itself against its own gravity, one said surface being heated to a higher temperature than the other said surface, and thereafter passing said heated sheet into the nip of a pair of rolls one of which is smooth-faced and the other of which has depressed portions on its face, the surface of said sheet which is heated to a higher temperature being in contact with said smooth-faced roll and the other said surface of said sheet being in contact with said roll having depressed portions on its face.

2. The method as claimed in claim 1 wherein one said surface is heated to a temperature of at least 5° F. higher than the temperature of the other said surface.

3. The method as claimed in claim 1 wherein the thermoplastic sheet is foamed polystyrene.

4. The method as claimed in claim 1 wherein said rolls are cooled such that said roll having depressed portions on its face is maintained at a lower temperature than the said smooth-faced roll.

5. The method as claimed in claim 2 wherein the thermoplastic sheet is foamed polystyrene.

6. The method as claimed in claim 5 wherein the said surface of said sheet heated to a higher temperature is heated to a temperature in the range of 200–220° F. and the other said surface is heated to a temperature of 170–190° F.

References Cited by the Examiner
UNITED STATES PATENTS

| | | | |
|---|---|---|---|
| 2,878,153 | 3/59 | Hacklander | 264—284 XR |
| 2,917,217 | 12/59 | Sisson. | |
| 2,928,124 | 3/60 | Hugger. | |

OTHER REFERENCES

SPE Journal article, "Controlled Density Polystyrene Foam Extrusion," July 1960, pages 705–709.

Modern Plastics, "New Techniques for Processing Expandable Styrene Foam," September 1963, pages 113, 114, 193, 196.

ALEXANDER H. BRODMERKEL, *Primary Examiner*,
MORRIS LIEBMAN, *Examiner*.